(12) United States Patent
Nguyen et al.

(10) Patent No.: US 7,813,406 B1
(45) Date of Patent: Oct. 12, 2010

(54) TEMPORAL LASER PULSE MANIPULATION USING MULTIPLE OPTICAL RING-CAVITIES

(75) Inventors: Quang-Viet Nguyen, Richmond Heights, OH (US); Jun Kojima, North Olmstead, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 645 days.

(21) Appl. No.: 11/402,997

(22) Filed: Apr. 13, 2006

Related U.S. Application Data

(63) Continuation-in-part of application No. 10/690,162, filed on Oct. 15, 2003, now abandoned.

(51) Int. Cl.
*H01S 3/082* (2006.01)
(52) U.S. Cl. .............................. 372/97; 372/30; 372/92; 372/94; 356/300; 356/301; 356/303
(58) Field of Classification Search ................... 372/30, 372/92, 94, 97; 356/300, 301, 303
See application file for complete search history.

(56) References Cited

U.S. PATENT DOCUMENTS

| | | | |
|---|---|---|---|
| 3,447,856 A | 6/1969 | De Lange | |
| 5,309,456 A * | 5/1994 | Horton | 372/25 |
| 5,337,333 A * | 8/1994 | Daly et al. | 372/94 |
| 5,496,306 A | 3/1996 | Engelhardt et al. | |
| 6,067,311 A * | 5/2000 | Morton et al. | 372/57 |
| 6,389,045 B1 * | 5/2002 | Mann et al. | 372/25 |

(Continued)

OTHER PUBLICATIONS

Verma et al "Design of an achromatic beam splitter comprising a dielectric multilayer stack" Applied Optics vol. 29, No. 10 Apr. 1990.*

(Continued)

*Primary Examiner*—Minsun Harvey
*Assistant Examiner*—Yuanda Zhang
(74) *Attorney, Agent, or Firm*—Robert H. Earp, III

(57) ABSTRACT

An optical pulse stretcher and a mathematical algorithm for the detailed calculation of its design and performance is disclosed. The optical pulse stretcher has a plurality of optical cavities, having multiple optical reflectors such that an optical path length in each of the optical cavities is different. The optical pulse stretcher also has a plurality of beam splitters, each of which intercepts a portion of an input optical beam and diverts the portion into one of the plurality of optical cavities. The input optical beam is stretched and a power of an output beam is reduced after passing through the optical pulse stretcher and the placement of the plurality of optical cavities and beam splitters is optimized through a model that takes into account optical beam divergence and alignment in the pluralities of the optical cavities. The optical pulse stretcher system can also function as a high-repetition-rate (MHz) laser pulse generator, making it suitable for use as a stroboscopic light source for high speed ballistic projectile imaging studies, or it can be used for high speed flow diagnostics using a laser light sheet with digital particle imaging velocimetry. The optical pulse stretcher system can also be implemented using fiber optic components to realize a rugged and compact optical system that is alignment free and easy to use.

17 Claims, 10 Drawing Sheets

U.S. PATENT DOCUMENTS

| | | | |
|---|---|---|---|
| 6,535,531 | B1 | 3/2003 | Smith et al. |
| 6,591,025 | B1* | 7/2003 | Siems et al. ............... 385/12 |
| 6,937,331 | B1 | 8/2005 | Nguyen |
| 6,967,977 | B2* | 11/2005 | Hasson ..................... 372/30 |
| 7,256,885 | B2* | 8/2007 | Silberberg et al. ......... 356/301 |

OTHER PUBLICATIONS

J. Kojima and Q.V. Nguyen, "Laser Pulse-Stretching with Multiple Optical Ring Cavities," Appl. Opt. 41, 6360-6370, (2002).

A.C. Eckbreth, *Laser Diagnostics for Combustion Temperature and Species*, 2nd ed. (Gordon & Breach, Amsterdam, 1996), pp. 209-273.

R.S. Barlow and C.D. Carter, "Raman/Rayleigh/LIF Measurements of Nitric Oxide Formation in Turbulent Hydrogen Jet Flames," Combust. Flame 97, 261-280 (1994).

S.P. Nandula, T.M. Brown, R.W. Pitz, and P.A. DeBarber, "Single-Pulse, Simultaneous Mutlipoint Multispecies Raman Measurements in Turbulent Nonpremixed Jet Flames," Opt. Lett. 19, 414-416 (1994).

D.F. Marran, J.H. Frank, M.B. Long, S.H. Stårner, and R.W. Bilger, "Intracavity Technique for Improved Raman/Rayleigh Imaging in Flames," Opt. Lett. 20, 791-793 (1995).

P.C. Miles, "Raman Line Imaging for Spatially and Temporally Resolved Mole Fraction Measurements in Internal Combustion Engines," Appl. Opt. 38, 1714-1732 (1999).

Q.V. Nguyen, R.W. Dibble, C.D. Carter, G.J. Fiechtner, and R.S. Barlow, "Raman-LIF Measurements of Temperature, Major Species, OH, and NO in a Methane-Air Bunsen Flame," Combust. Flame 105, 499-510 (1996).

F. Rabenstein and A. Leipertz, "Two-Dimensional Temperature Determination in the Exhaust Region of a Laminar Flat-Flame Burner with Linear Raman Scattering," Appl. Opt. 36, 6989-6996 (1997).

Y.-L. Chen and J.W.L. Lewis, "Visualization of Laser-Induced Breakdown and Ignition," Opt. Exp. 9, 360-372 (2001); http://www.opticsexpress.org.

G. Harigel, C. Baltay, M. Bregman, M. Hibbs, A. Schaffer, H. Bjelkhagen, J. Hawkins, W. Williams, P. Nailor, R. Michaels, and H. Akbari, "Pulse Stretching in a Q-Switched Ruby Laser for Bubble Chamber Holography," Appl. Opt 25, 4102-4110 (1986).

S. Pflüger, M. Sellhorst, V. Sturm, and R. Noll, "Fiber-Optic Transmission of Stretched Pulses from a Q-Switched Ruby Laser," Appl. Opt. 35, 5165-5169 (1996).

M. Matsumoto, "Theory of Stretched-Pulse Transmission in Dispersion-Managed Fibers," Opt. Lett. 22, 1238-1240 (1997).

V. Cauthaerts, D.J. Richardson, R. Paschotta, and D.C. Hanna, "Stretched Pulse $Yb^{3+}$:silica fiber laser," Opt. Lett 22, 316-318 (1997).

T.J. Anderson, R.D. Woodward, and M. Winter, "Oxygen Concentration Measurements in a High Pressure Environment Using Raman Imaging," paper AIAA-95/0140, presented at the Thirty-Third Aerospace Science Meeting and Exhibit, Reno. Nev., Jan. 5-8, 1995.

B.B. Daily, A.R. Masri, R.S. Barlow, and G.J. Fiechtner, "Instantaneous and Mean Compositional Structure of Bluff-Body Stabilized Nonpremixed Flames," Combust. Flame 114, 119-148 (1998).

F. Rabenstein, J. Egermann, A. Leipertz, and N. D'Alfonso, "Vapor-Phase Structures of Diesel-Type Fuel Sprays: An Experimental Analysis," SAE Paper 982543 (Society of Automotive Engineers, Warrendale, Pa., 1998).

R.S. Barlow and P.C. Miles, "A Shutter-Based Line-Imaging System for Single-Shot Raman Scattering Measurements of Gradients in Mixture Fraction," in the *Proceedings of the Combustion Institute* (Combustion Institute, Pittsburgh, Pa, 2000), vol. 28, pp. 269-277.

P.A. Nooren, M. Versluis, T.H. van der Meer, R.S. Barlow, and J.H. Frank, "Raman-Rayleigh-LIF Measurements of Temperature and Species Concentrations in the Delft Piloted Turbulent Jet Diffusion Flame," Appl. Phys. B 71, 95-111 (2000).

J. Egermann, W. Koebcke, W. Ipp, and A. Leipertz, "Investigation of the Mixture Formation Inside a GDI Engine by Means of Linear Raman Spectroscopy," in the *Proceedings of the Combsution Institute* (Pittsburgh, Pa., 2000), vol. 28, pp. 1145-1151.

Turbulent Combustion Laboratory, Sandia National Laboratories, http://www.ca.sandia.gov/CRF/03_facilities/03_Fac-TDFL.html (2001).

X.T. Phuoc, "Laser Spark Ignition: Experimental Determination of Laser-Induced Breakdown Thresholds of Combustion Gases," Op. Commun. 175, 419-423 (2000).

\* cited by examiner

TEMPORAL LASER PULSE MANIPULATION USING MULTIPLE OPTICAL RING-CAVITIES

This is a Continuation-In Part of application Ser. No. 10/690,162 filed Oct. 15, 2003. The disclosure of the prior application(s) is hereby incorporated by reference herein in its entirety.

ORIGIN OF THE INVENTION

The invention described herein was made by employees of the United States Government and may be manufactured and used by or for the Government for Government purposes without payment of any royalties thereon or therefore.

BACKGROUND OF THE INVENTION

1. Field of Invention

The present invention relates to production of specific types of laser light that can be used in analysis of certain systems. In particular, the present invention is directed to methods for splitting up a pulsed laser beam into multiple pulsed beams, each eventually traveling in the same direction to a target. The manipulated pulses may be beneficially used in ultrahigh-speed imaging and other applications.

2. Description of Related Art

Non-intrusive, laser-based optical diagnostic techniques are important in spatially and temporally resolved measurements of turbulent and chemically reacting flow processes such as combustion. In particular, spontaneous Raman scattering (SRS) spectroscopy using pulsed lasers is one of the few techniques that can provide a quantitative measurement of major chemical species concentrations and temperature in turbulent reacting flows. In order to collect high-quality SRS data in gas-phase flows, high-energy pulsed lasers are required to compensate for the weak signal levels generated by the Raman effect.

In the past decade, reliable high energy (and high peak power) Q-switched (QS) Nd:YAG lasers that produce circa 1 J pulses at 532 nm have been used for SRS measurements of gas-phase molecular species. This wavelength output obtained by second harmonic generation (SHG) is a popular choice for SRS excitation and is often used since it maximizes the weak Raman signal with conventional visible-wavelength optics and detectors. However, high energy QS lasers often suffer from laser-induced plasma spark generation at the focused probe volume. The strong optical emission from the plasma spark overwhelms the weak Raman scattering signal, making spatially resolved measurements with high energy QS Nd:YAG lasers very challenging.

Previously, flashlamp-pumped dye lasers, although inconvenient to use, were often employed for SRS excitation since they produced laser pulse energies of order 1 J over several microseconds at 532 nm, avoiding the plasma spark problems inherent with QS Nd:YAG lasers. Note that SRS signal is linearly proportional to the total energy of laser pulse and not the intensity.

Thus, a way of reducing the peak laser power while maintaining the total pulse energy is needed to facilitate SRS measurements in combustion environments using the readily available and convenient QS Nd:YAG laser. Additionally, the processes need to be simple, low cost and relatively compact, and the design parameters of the processes need to be easily optimized to the requirements of particular applications.

SUMMARY OF THE INVENTION

According to one embodiment of the invention, an optical pulse stretcher is disclosed. The optical pulse stretcher has a plurality of optical cavities, having multiple optical reflectors such that an optical path length in each of the optical cavities is different. The optical pulse stretcher also has a plurality of beam splitters, each of which intercepts a portion of an input optical beam and diverts the portion into one of the plurality of optical cavities. The input optical beam is stretched and a power of an output beam is reduced after passing through the optical pulse stretcher and the placement of the plurality of optical cavities and beam splitters is optimized through a model that takes into account optical beam divergence and alignment in the pluralities of the optical cavities.

Additionally, each optical cavity may provide a delay time for the input optical beam based on the optical path lengths of the optical cavities and a ratio of delay times for successive optical cavities may form a geometric progression. Also, the number of optical cavities may be three, where each may provide a delay time and the ratio of delay times for the three optical cavities may be 4:2:1.

In addition, the optical path lengths in each of the optical cavities may be based on the pulse width of the input optical beam. Also, the output beam of the optical pulse stretcher may be such that it is suitable for use in a spontaneous Raman-scattering spectroscopy system. Also, one of the plurality of beam splitters, that diverts a particular portion of the input optical beam into one of the plurality of optical cavities having a shortest cavity length, may have a reflectivity of approximately 40%.

According to another embodiment, a method of stretching an optical pulse is disclosed. The method includes the steps of introducing an input optical beam to a first beam splitter of a plurality of beam splitters, diverting a portion of the input optical beam through interception by the first beam splitter into a first optical cavity of a plurality of optical cavities, where each of the optical cavities has multiple optical reflectors such that an optical path length in each is different and receiving an output beam portion from the first optical cavity through the first beam splitter. The method also includes repeating the introducing, diverting and receiving steps for a remainder of the plurality of beam splitters and optical cavities with the input beam and output beam portions to produce an output optical beam that is stretched and has a power that is reduced when compared to the input optical beam and optimizing a placement of the plurality of optical cavities and beam splitters through a model that takes into account optical beam divergence and alignment in the pluralities of the optical cavities.

According to another embodiment, an optical pulse stretcher is disclosed. The optical pulse stretcher includes a plurality of diverting means for diverting portions of input optical beams into input portions, a plurality of optical delay means for receiving, circulating and subsequently releasing the input portions to produce output portions through the plurality of diverting means, where each diverting means and each optical delay means are paired together and optimizing means for optimizing a placement of the optical delay means and diverting means through a model that takes into account optical beam divergence and alignment in the optical delay means. The output portions produce an output optical beam that is stretched and has a power that is reduced when compared to the input optical beam.

These and other variations of the present invention will be described in or be apparent from the following description of the preferred embodiments.

BRIEF DESCRIPTION OF THE DRAWINGS

For the present invention to be easily understood and readily practiced, the present invention will now be described, for purposes of illustration and not limitation, in conjunction with the following figures.

DETAILED DESCRIPTION OF PREFERRED EMBODIMENTS

In its most general description, the present invention is directed toward a simple and passive nanosecond-long laser 'pulse-stretcher' using multiple optical ring-cavities. The term 'pulse-stretcher' is ideally suited for ns-long laser pulses and is different than the time-bandwidth-product type of pulse-stretcher that is routinely used in ultra-fast (femtosecond) laser systems. Several concepts of pulse-stretching using electro-optical devices have been reported. These other concepts were primarily intended to permit launching QS lasers pulses into optical fibers without damaging the fiber input faces. However, there are few pulse-stretching systems designed to reduce the high peak power of ns-long 532 nm laser pulses from QS Nd:YAG lasers. Many of these techniques rely on complicated and often expensive electro-optic modulators to control the intra-cavity pulse buildup in the laser.

The present invention is directed to, in several embodiments, a laser pulse-stretching system that uses a series of optical ring-cavities. The present invention is also directed to the techniques used to design and optimize a reliable and passive pulse-stretching system for ns-long pulses. The goals of the optimization process are: minimizing peak laser power, avoiding laser-induced plasma spark generation and avoiding damage to optical components in the beam path. These goals are then realized through a numerical calculation of the temporal and spatial profiles of the stretched-pulses using the model. The results will clearly show the effects of key parameters such as: beam splitter reflectivity, optical cavity delay time, laser beam pointing instability, and laser beam divergence on the performance of the pulse-stretcher. The numerically optimized pulse-stretcher design will then be experimentally verified using a 3-cavity pulse-stretcher and a 1000 mJ/pulse QS Nd:YAG laser source.

Figure 1:
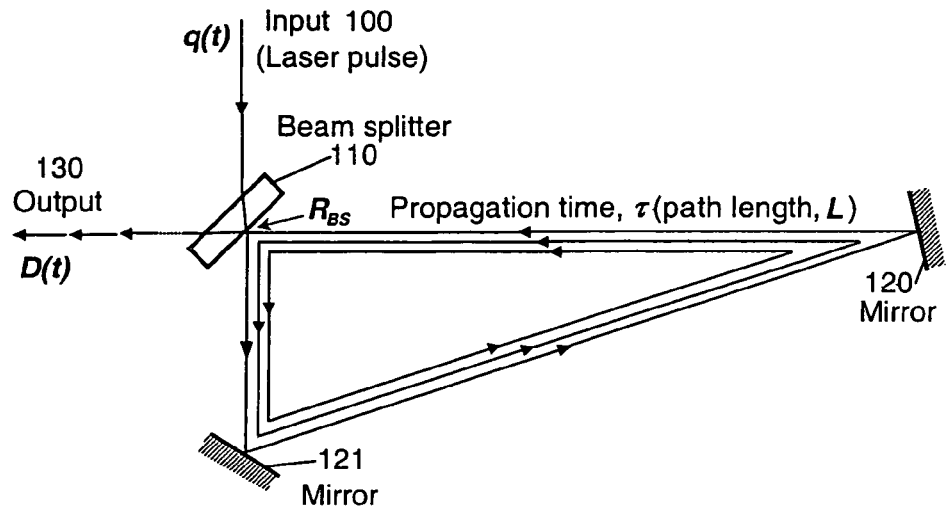
FIG. 1 provides an example of a schematic of the basic right-triangle ring-cavity that may be used as a pulse stretcher, according to one embodiment of the present invention.

The pulse-stretcher concept is based on a simple partially transmitting optical ring-cavity that is arranged in a right-triangle as shown in FIG. 1. Although other angles can be used, the right-triangle configuration permits the superposition of the input and output pulses upon exiting the cavity using readily available off-the-shelf 45° incidence beam splitters. The cavity has an input 100, multiple mirrors 120 and 121 and a beam splitter 110. The ring-cavity traps and stores a portion of the circulating laser pulse, subsequently releasing the stored pulse through the output 130 over a longer period of time as determined by the intra-cavity leakage rate $(1-R_{BS})$, where $R_{BS}$ is the beam splitter reflectivity, and the optical delay time $\tau$, as determined by the optical propagation path length L in the optical cavity.

From FIG. 1, if the path of an 'original' laser pulse is followed into the cavity, it is first partially reflected (by $R_{BS}$) at the beam splitter. The remainder of the laser pulse is then transmitted (by $1-R_{BS}$) through the beam splitter. The pulse then circulates inside the cavity for a time period; and is then is partially extracted via leakage through the beam splitter. The remainder of the pulse that is transmitted undergoes another round-trip in the cavity or is reflected/transmitted again, etc. The optical pulses exiting from the cavity have delay times given by $\tau$, $2\tau$, ..., $k\tau$, where k is an integer representing the number of round-trips in the cavity. Thus the ring-cavity divides an initially large amplitude laser pulse into many smaller amplitude pulses.

Figure 2:
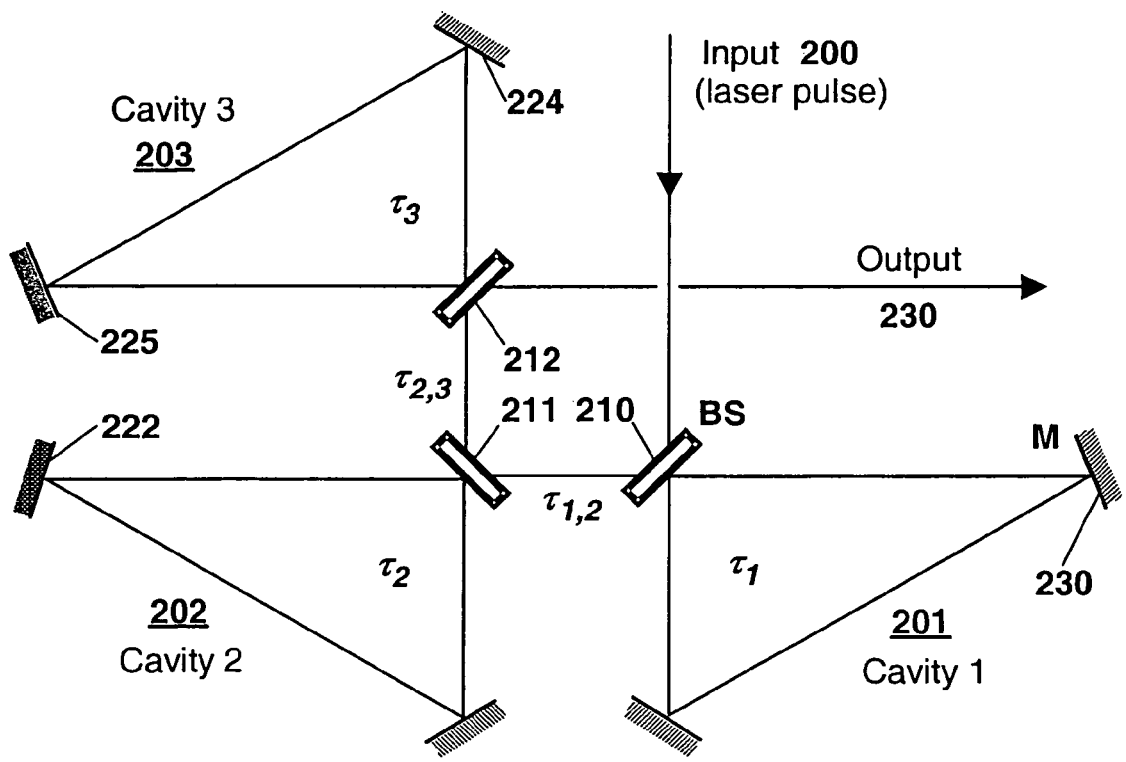
FIG. 2 illustrates a schematic of a pulse-stretcher using multiple partially-transmitting optical ring-cavities (3-cavity arrangement), according to one embodiment of the present invention.

The pulses leaving one cavity can then be used as the input into other cavities to further stretch out the temporal profile of the laser pulse. FIG. 2 shows a schematic, according to one embodiment, of a pulse-stretcher using three combined ring-cavities (201, 202, and 203). The schematic also has several beam splitters 210-212, mirrors 221-225, an input 200 and an output 230. Each subsequent optical cavity divides an input pulse into multiple output pulses in the same way as the first cavity as shown in FIG. 1, with optical delay times given by: $\tau_1$, $\tau_2$, $\tau_3$, respectively. The multiple pulses created by these three cavities are subsequently recombined (a superposition in space and shifted in time) by the final beam splitter into an aggregate of many pulses, which appear as a single pulse with a longer temporal width. In general, subsequent cavities have shorter delay times ($\tau_1 > \tau_2 > \tau_3$) to produce an aggregate series of pulses that appear to be one.

The analytical model of the pulse-stretching process is based on FIGS. 1 and 2. In order to simulate the temporal evolution of a laser pulse through the optical system, it is first assumed a Gaussian temporal laser pulse shape for the purposes of demonstrating this model. Although any arbitrary laser pulse shape can be used (through a fitted function), a Gaussian was found to closely approximate an injection-seeded QS laser pulse and is by definition, normalized. The instantaneous laser pulse power is then given by:

$$q(t) \equiv E \frac{2\sqrt{\ln(2)}}{\sqrt{\pi}\, d_t} \exp\left[-\left(\frac{2\sqrt{\ln(2)}\,t}{d_t}\right)^2\right], \quad (1)$$

where q(t) has units of [J/s] or [W], and t is the time [s], E is the laser pulse energy [J], $d_t$ is the temporal width of the laser pulse at full-width-half-maximum (FWHM) [s].

In order to generalize the model for an arbitrary laser pulse width, the following non-dimensional parameters are defined:

$$\chi \equiv \frac{t}{d_t}, \quad (2a)$$

$$\Lambda \equiv \frac{E}{E_0}, \quad (2b)$$

$$P_0 \equiv \frac{E_0}{d_t}. \quad (2c)$$

$$\tau_i \equiv \frac{\Delta t_i}{d_t}, \quad (2d)$$

$$\tau_{j,k} \equiv \frac{\Delta t_{j,k}}{d_t}, \quad (2e)$$

where $\chi$ is the non-dimensional time; $\Lambda$ is the non-dimensional laser energy, $E_0$ is normal unit energy [1 J]; $P_0$ is the unit-laser power based the laser pulse width $d_t$; $\Delta t_i$ is the round-trip propagation time for cavity i ("delay time") [s]; $\tau_i$ is the non-dimensional delay time for cavity i; $\Delta t_{j,k}$ is the propagation time of light from cavity j to k [s]; and $\tau_{j,k}$ is the non-dimensional transit time from cavity j to k.

Using equations (2a-2c) and normalizing equation (1) by $P_0$ following $q(\chi d_t)/P_0 = Q(\chi)$, equation (1) can be rewritten in non-dimensional form as:

$$Q(\chi) \equiv \frac{\Lambda 2\sqrt{\ln(2)}}{\sqrt{\pi}} \exp\left[-\left(2\sqrt{\ln(2)}\,\chi\right)^2\right], \quad (3)$$

which expresses the non-dimensional instantaneous laser power as a function of the non-dimensional time $\chi$. If the path of a light pulse is followed through the optical cavity shown in FIG. 1, it can be seen that the instantaneous output pulse power from cavity 1 (i=1) is then given by:

$$D_1(\chi) = \underbrace{R_{BS} Q(\chi)}_{\text{Initial}} + \underbrace{(1-R_{BS})^2 Q(\chi - \tau_1)}_{1^{st}\text{pass}} + \underbrace{(1-R_{BS})^2 R_{BS} Q(\chi - 2\tau_1)}_{2^{nd}\text{pass}} + , \quad (4)$$
$$\ldots + \underbrace{(1-R_{BS})^2 R_{BS}^{n-1} Q(\chi - n\tau_1)}_{n^{th}\text{pass}}$$
$$= R_{BS} Q(\chi) + (1-R_{BS})^2 \sum_{n=1}^{N} R_{BS}^{n-1} Q(\chi - n\tau_1)$$

where $\tau_1$ is the non-dimensional delay time for cavity 1, and N is the number of round-trips of the laser pulse inside the cavity. $D_0(\chi) = Q(\chi)$ for i=1. $D_1(\chi)$ then also represents the input pulse for the second cavity (i=2). Similarly, the instantaneous non-dimensional laser power from cavity 2 is then given by:

$$D_2(\chi) = R_{BS} D_1(\chi - \tau_{1,2}) + (1-R_{BS})^2 \sum_{m=1}^{N} R_{BS}^{m-1} D_1[\chi - (\tau_{1,2} + m\tau_2)], \quad (5)$$

where $\tau_2$ is the non-dimensional delay time for cavity 2, and $\tau_{1,2}$ is the transit time from cavity 1 to cavity 2.

Equations (4 & 5) show a pattern that permits us to describe the instantaneous non-dimensional laser power from an arbitrary cavity i using the following recursion formula:

$$D_i(\chi) \equiv \quad (6)$$
$$R_{BS} D_{i-1}(\chi - \tau_{i-1,i}) + (1-R_{BS})^2 \sum_{k=1}^{N} R_{BS}^{k-1} D_{i-1}[\chi - (\tau_{i-1,i} + k\tau_i)],$$

where $\tau_{0,1} = 0$ for i=1. By substituting (i=3) into equation (6), an equation that describes $D_3(\chi)$ is produced, the instantaneous non-dimensional laser pulse profile of the final output from the 3-cavity pulse-stretcher system (the output of cavity 3 may be called the "stretched-pulse"). It is noted that equation (6) permits the modeling a pulse-stretcher with an arbitrary number of optical cavities.

For the purposes of most calculations, a cavity round-trip value of N=10 was found to give a good approximate convergence of the above summations, that is N=10 was sufficient to dissipate $Q(\chi)$. Although the analysis is non-dimensional, there are some parameters that eventually need to be evaluated based on real physical constraints such as the cavity-to-cavity propagation times as defined by equation (2e). In the following calculations, $\tau_{1,2} = 0.18$, and $\tau_{2,3} = 0.13$ was used as initial inputs unless another number is described. Note that the results of the analysis can easily be converted to real temporal units [s] by applying equation (2a). That is, the non-dimensional axis ($\chi$) represents actual time units in multiples of the FWHM of the input laser pulse width [s].

A precise alignment of the optical ring-cavities in the pulse-stretcher is required to realize the best performance from the pulse-stretcher. However, in practice, it is difficult to align such a system perfectly by hand. Thus, the effect of optical misalignment and shot-to-shot beam pointing instability need to be estimated on the pulse-stretcher performance in terms of the spatial profile of the resulting output pulse. The spatial profile of the output pulse is affected by small angular deviations in the optical alignment, beam pointing stability and beam divergence will now be examined.

Figure 3:
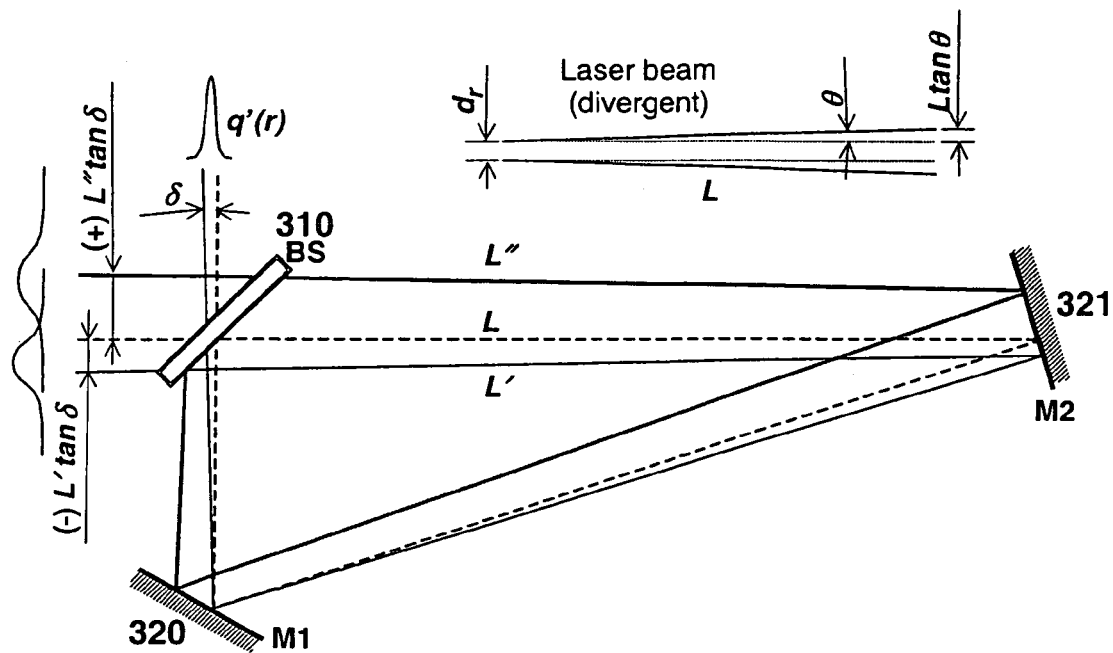
FIG. 3 illustrates a schematic of the basic pulse-stretcher model with spatial pulse profile effects, including beam deviation, $\delta$ and beam divergence, $\theta$ (for cavity 1), according to one embodiment of the present invention.

From FIG. 3, it can be seen that in the case of small deviations in the alignment of a mirror by an angle $\pm \delta$, a lateral spatial displacement of the output beam profile by $\pm L \tan(\delta)$ will be produced for a single round-trip of path length L. Note that $\delta$ may have resulted from either shot-to-shot beam pointing instability, or from a misalignment in one of the mirrors in the cavity which causes a successively larger lateral spatial shift in the position of the beam upon every round-trip inside the cavity.

Moreover, the laser beam divergence represented by $\theta$, causes a gradual expansion of the beam diameter which grows with each round-trip within the cavity. Thus, the output beam diameter with a long optical propagation distance will be significantly larger than the input beam diameter purely from the effects of finite beam divergence as shown in FIG. 3. Thus the deviation angle $\delta$, and beam divergence $\theta$ causes the spatial profile of the output beam to spread dramatically after passing through the pulse-stretcher.

Examining these effects numerically (assuming radial symmetry for simplicity) occurs with the same model used for the temporal pulse profile but converted to the spatial domain using geometry and a $\tan(\theta)$ transformation. First, the one-dimensional spatial profile of an original laser pulse (assumed to be a Gaussian function in space) is defined as:

$$q'(r, L) \equiv E \frac{2\sqrt{\ln(2)}}{\sqrt{\pi}(2L\tan\theta + d_r)} \exp\left[-\left(\frac{2\sqrt{\ln(2)}}{(2L\tan\theta + d_r)}\right)^2\right], \quad (7)$$

where $q'(r, L)$ has units of [J/cm], and r is the radial position [cm], E is the laser pulse energy [J], $d_r$ is the initial diameter of the original laser pulse at FWHM [cm], $\theta$ is the beam divergence half-angle [rad], and L is the optical propagation distance [cm] (initially zero).

In a manner similar to the previous temporal analysis, the following non-dimensional parameters may be defined in order to generalize the results based on the spatial FWHM of the original laser pulse:

$$\rho \equiv \frac{r}{d_r}, \quad (8a)$$

$$\tilde{L}_i \equiv \frac{\Delta L_i}{d_r}, \quad (8b)$$

$$\tilde{L}_{j,k} \equiv \frac{\Delta L_{j,k}}{d_r}, \quad (8c)$$

where $\rho$ is the non-dimensional radial position; $\Delta L_i$ is the optical propagation distance for cavity i (initially zero); $\tilde{L}_i$ is the non-dimensional optical propagation distance for cavity i; $\Delta L_{j,k}$ is the optical propagation distance between cavity i and cavity j [cm]; $\tilde{L}_{j,k}$ is the non-dimensional optical propagation distance between cavity j and cavity k.

Using equations (2b & 8a-8b), equation (7) may be recast in non-dimensional form as:

$$Q'(\rho, \tilde{L}_i) \equiv E \frac{2\sqrt{\ln(2)}}{\sqrt{\pi}(2\tilde{L}_i\tan\theta + 1)} \exp\left[-\left(\frac{2\sqrt{\ln(2)}\rho}{(2\tilde{L}_i\tan\theta + 1)}\right)^2\right], \quad (9)$$

From the recursion formula given by equation (6), and given an incident laser pulse with a deviation angle $\delta$ [rad] with respect to the original propagation ray angle, the one-dimensional spatial profile of the output pulse as a function of non-dimensional distance $\rho$, from an arbitrary cavity i, would be then given by the following recursion formula:

$$D'_i(\rho, \Psi_i) \equiv \quad (10)$$
$$R_{BS}D'_{i-1}(\rho, \Psi_{i(n=0)}) + (1 - R_{BS})^2 \sum_{n=1}^{N} R_{BS}^{n-1} D'_{i-1}[\rho - (-1)^n \Psi_i \tan\delta, \Psi_i]$$

where $\Psi_i$ is defined as equal to $n\tilde{L}_i + \tilde{L}_{i-1,i}$, the non-dimensional intra-cavity propagation distance, and $D'_0(\rho, \Psi_i) = Q'(\rho, \tilde{L}_i)$, and $\tilde{L}_{0,1} = 0$ for i=1. If (i=3) is substituted into equation (10), a relation showing $D'_3(\rho, \Psi_3)$ is obtained, the non-dimensional spatial profile of the stretched output pulse. The non-dimensional profile is easily converted to real units [J/cm] by applying equations (2b & 8a).

For the purposes of optimizing the pulse-stretcher, it is assumed that a 3-cavity arrangement is used so that other parameters can be optimized initially. The pulse-stretcher described above has several parameters that can be varied, these include: (1) ratio of delay times for each cavity, $\tau_1 : \tau_2 : \tau_3$ determined by the optical propagation distance in each cavity; (2) the delay time of cavity 1, $\tau_1$ as it relates to the laser pulse width; and (3) the beam splitter reflectivity, $R_{BS}$. Once these parameters are optimized, the last parameter can then be examined, (4) the number of optical ring-cavities. Each parameter will now be examined to optimize and determine the ideal pulse-stretcher configuration.

Figure 4:
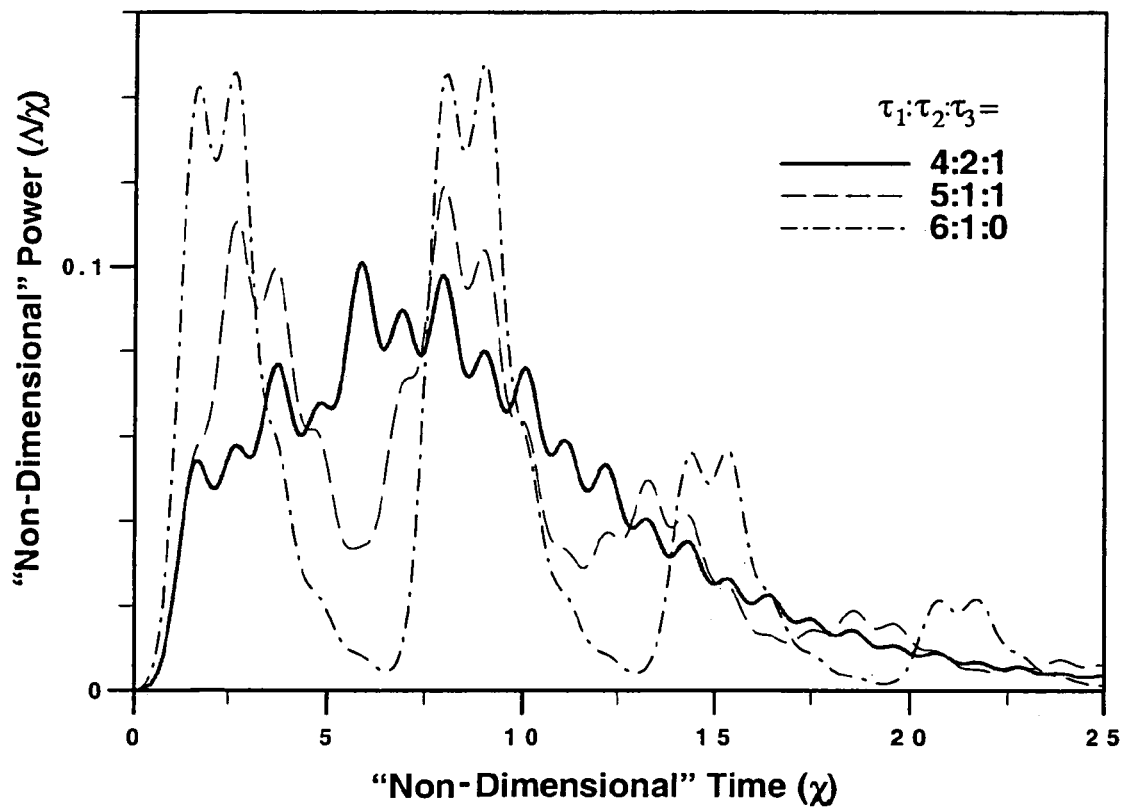
FIG. 4 illustrates the calculated output laser pulse shapes for different delay time ratios, $\tau_1:\tau_2:\tau_3$, with the ordinate of the graph $\Lambda/\chi$, showing the non-dimensional laser power, according to one embodiment of the present invention.

In order to examine the effect of the first parameter, the ratio of delay times on the efficacy of the pulse-stretcher, different combinations of cavity-delay ratios are tried. FIG. 4 shows the output pulse shapes from the pulse-stretcher for different ratios of delay times, $\tau_i : \tau_2 : \tau_3$. A pulse in the case of $\tau_i : \tau_2 : \tau_3 = 4:2:1$ has a relatively smooth shape and lower peak power than others. Shapes of other pulses are highly distorted or bunched-up and oscillating. This result shows that delay time ratios which double in geometric progression, that is $\tau_1 : \tau_2 : \tau_3 = 4n:2n:n$ (where n is integer), are best to recombine multiple pulses into a smooth single output pulse. From FIG. 4, it can be seen that using the proper cavity-delay ratios is critical in creating a smooth output pulse with the lowest possible peak power.

The effect of the second parameter is now investigated, the delay time length on the efficacy of the pulse-stretcher. FIG. 5 (a) shows variation of the peak laser power as a function of delay time. FIG. 5 (b) shows variation of the temporal pulse width of output pulses with changing of delay time, $\tau_1$ from 1.0 to 7.5, and also shows the temporal pulse shape for $\tau_1=6.5$ case. Here, the temporal width (FWHM) makes sense for "Gaussian-like" pulses, but not for highly distorted of oscillating pulse shapes such as shown in FIG. 4. Thus, the $1/e^2$ standard may be established for defining laser temporal pulse width for more consistency between different types of pulse shapes.

Figure 5A:
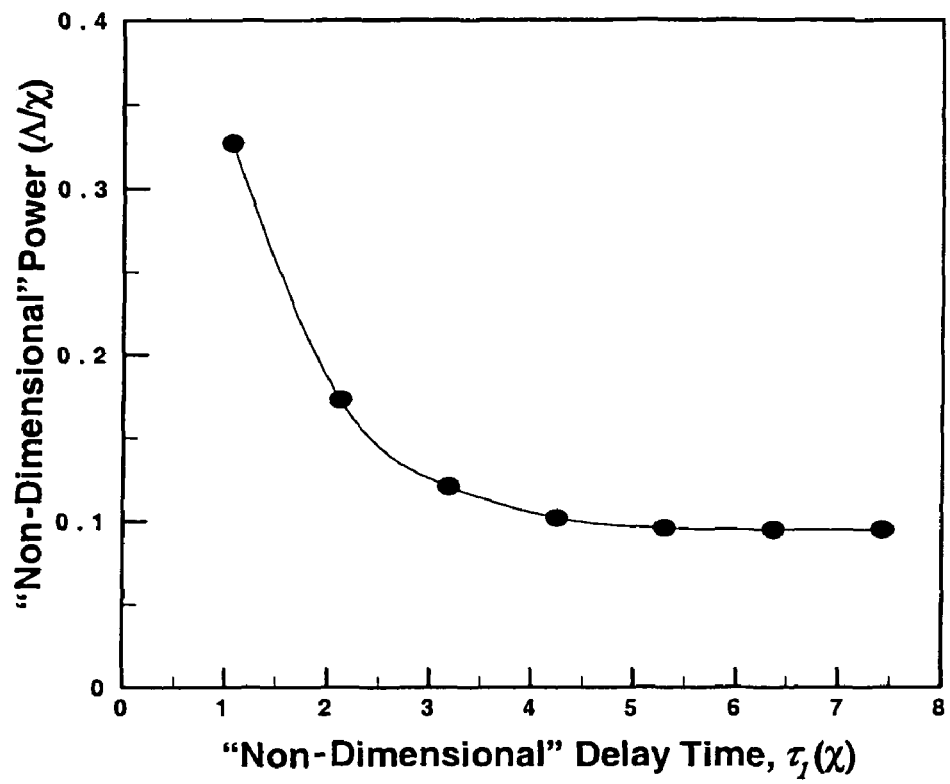
FIG. 5 illustrates the calculated variations in the output pulse power and width as a function of cavity 1 delay times, $\tau_i$, with FIG. 5(*a*) showing the effect on peak power and FIG. 5(*b*) showing the effect on output pulse width, according to one embodiment of the present invention.
Figure 5B:
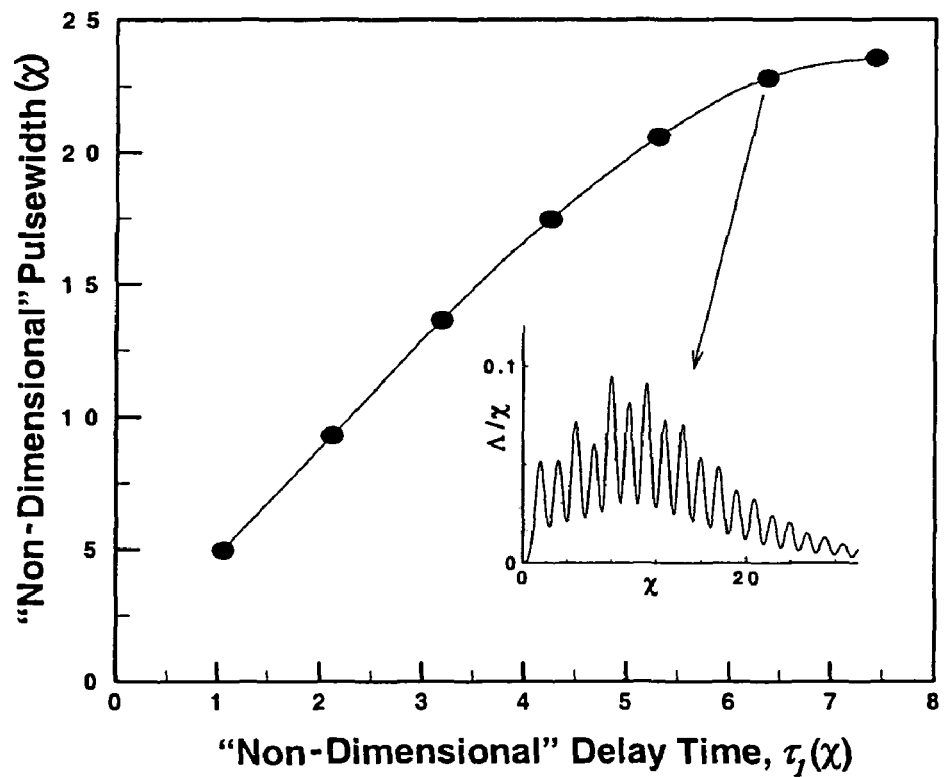

As shown in FIG. 5(a), the peak laser power decreases with an increase in $\tau_1$ but it does not change very much past a $\tau_1$ value of about 4. Note that the pulse width increases with an increase in the value of $\tau_1$. However, when $\tau_1>5$, the stretched output pulses do not recombine into a smooth pulse, but instead appear highly distorted in shape with multiple peaks that are over twenty times wider than the original pulse as shown in FIG. 5(b). As a result, a non-dimensional delay time of approximately $\tau_1=4$ appears to be ideal for delay of the first cavity of a 3-cavity pulse-stretcher system. Based on this finding, and the fact that a 4:2:1 ratio for the different cavity delay times is best, it can be seen that the optimum pulse-stretcher cavity lengths (and delay times) are dictated completely by the input pulse width of the laser source. Thus, the shortest stage of the pulse-stretcher cavity should have a round-trip propagation time equal to the laser pulse temporal width $d_t$ (FWHM) [ns]. Accordingly, subsequent longer-delay time cavities should double in geometric progression.

Figure 6A:
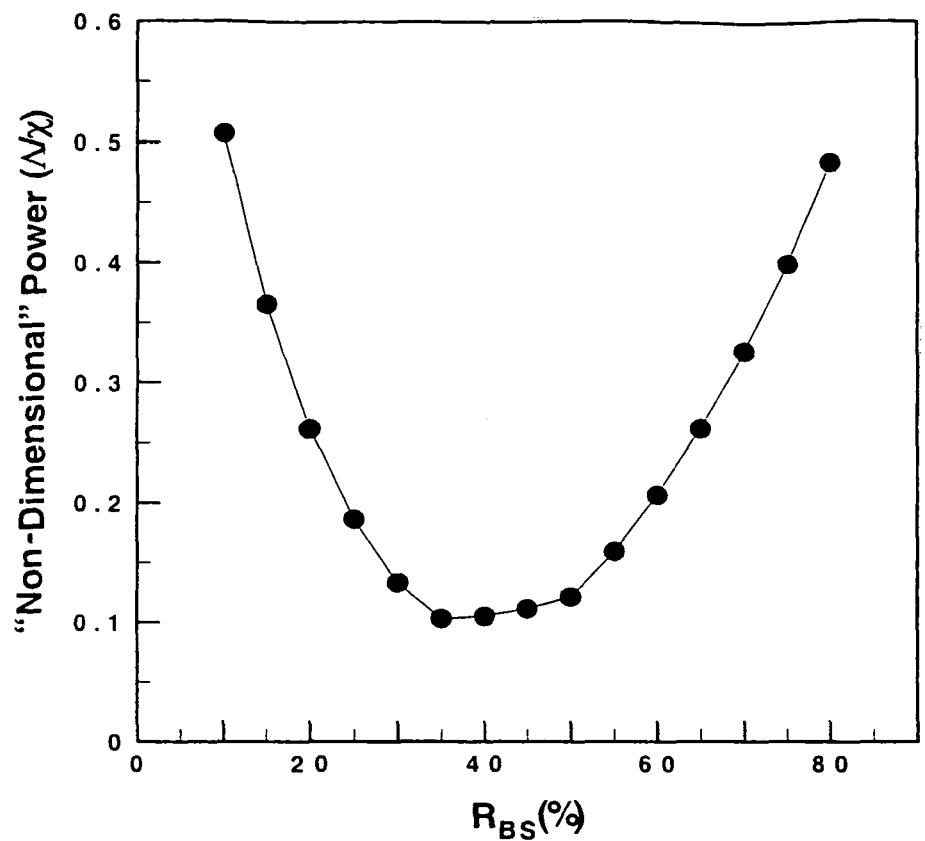
FIG. 6 illustrates the calculated variations in output laser pulse power and width as a function of beam splitter reflectivity, $R_{BS}$, with FIG. 6(*a*) showing the effect on peak power and FIG. 6(*b*) showing the effect on pulse width, according to one embodiment of the present invention.
Figure 6B:
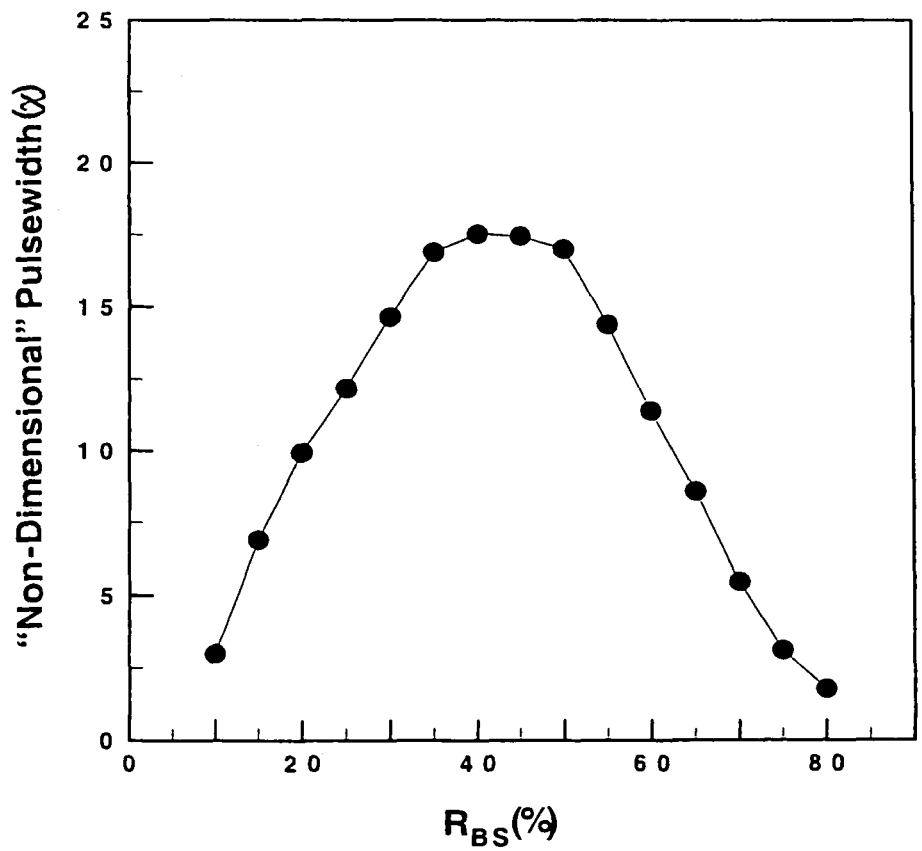

Next, the effect of beam splitter reflectivity on the performance of the pulse-stretcher is discussed. FIG. 6 shows variations of the peak pulse power and the temporal width of output pulses with changes in the reflectivity of beam splitter, $R_{BS}$ from 10% to 80%. From FIGS. 5 and 6, it is clear that for an $R_{BS}$ value of approximately 40% yields the best combination of lowest peak laser power and shortest overall pulse width. A short overall pulse width is desirable to minimize the optical cavity length and for the better temporal resolution. Thus, a 3-cavity optical configuration with the following parameters resulted in the optimum pulse-stretcher performance: delay time ratios $\tau_1:\tau_2:\tau_3 \approx 4:2:1$, initial delay time $\tau_1 \approx 4$, and beam splitter reflectivity $R_{BS} \approx 40\%$.

Figure 7:
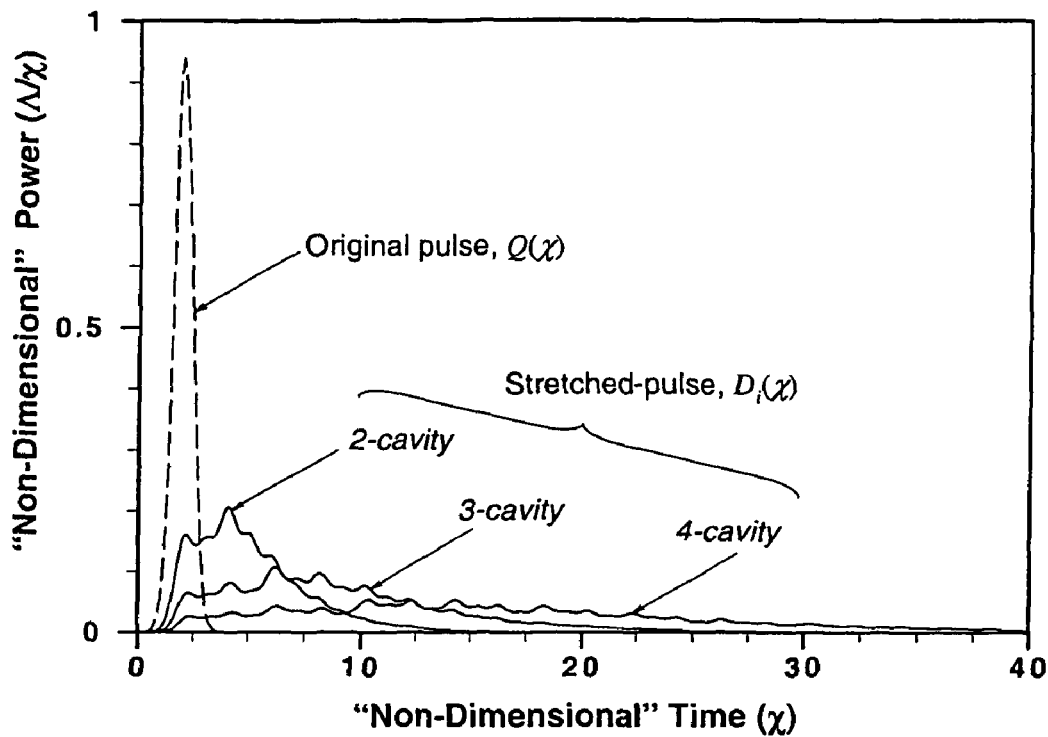
FIG. 7 illustrates the calculated output profiles of with optimized parameters in a 2-, 3-, and 4-cavity arrangement, according to various embodiments of the present invention.

Although for all the above calculations have been made assuming a 3-cavity system (for the purposes of minimizing the physical size of the pulse-stretcher), additional cavities in a pulse-stretcher affect the temporal profile of the stretched-pulse. FIG. 7 shows the calculated laser pulse profiles for an original input laser pulse, $Q(\chi)$ and the three different stretched output pulses: $D(\chi)$ from a 2-cavity pulse-stretcher with $\tau_1: \tau_2=2:1$ ($\tau_1=2$) based on equation (5); $D(\chi)$ from a 3-cavity pulse-stretcher using the optimized optical parameters determined from the above exercise ($\tau_1:\tau_2:\tau_3=4:2:1$, $\tau_1=4$); and $D(\chi)$ from 4-cavity pulse-stretcher with ($\tau_1:\tau_2:\tau_3:\tau_4=8:4:2:1$, $\tau_1=8$) based on equations (3-6). From FIG. 7, it can be clearly seen that each additional cavity produces a longer and lower peak power stretched output pulse. It can also be seen that the optical configuration of the pulse-stretcher (via number of cavities, ratio of delay times, beam splitter reflectivity) permits us to manipulate temporal profile of laser pulse in many different ways.

However, the optical propagation distance becomes longer according to the total delay time of all cavities (i.e. $\tau_1+\tau_2+\tau_3+\ldots$), so a 4-cavity pulse-stretcher will have beam divergence effects that become increasingly worse compared to a 3-cavity system. Furthermore, a 4-cavity system needs more physical area. For example, a 4-cavity system would require a 19.2 m long cavity-1 for an original laser pulse width d, of 8 ns (FWHM). This kind of optical table space is prohibitively expensive (or unavailable in most laboratories). Thus, according to one embodiment, a 3-cavity arrangement is selected for implementation based on a tradeoff between minimizing the size of the pulse-stretcher and the requirement that we reduce the peak power to 0.10×. Additionally, the 3-cavity system provides a relatively smooth and continuous output pulse profile (in time).

Figure 8:
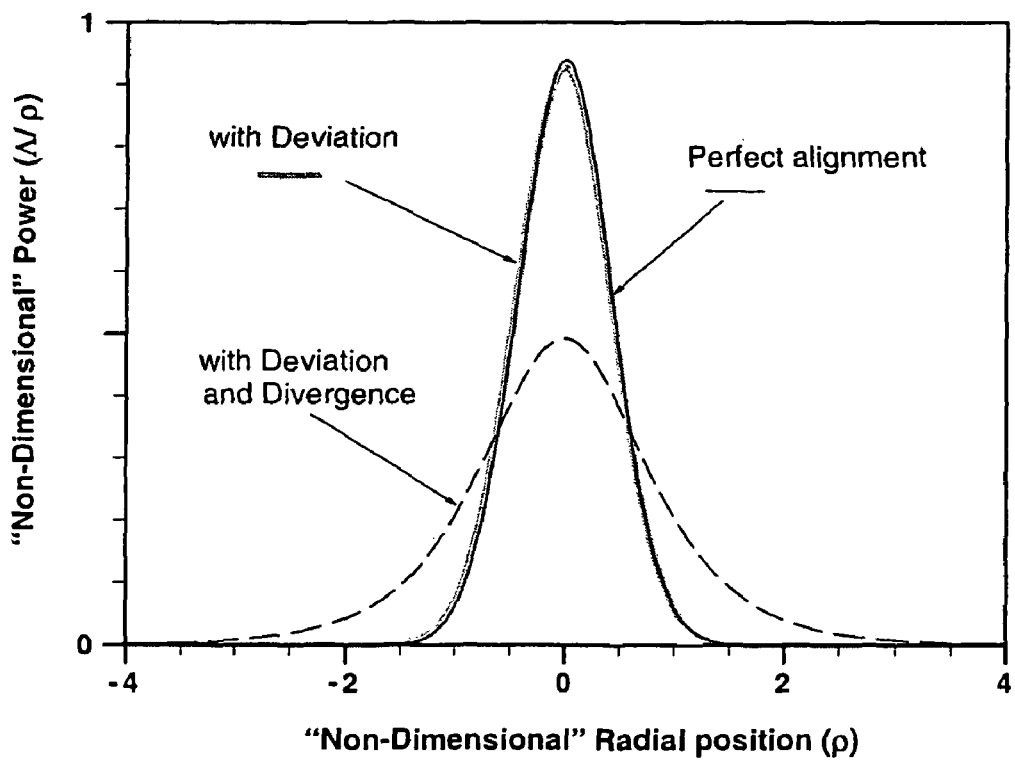
FIG. 8 illustrates calculated 1-dimensional spatial profiles of the stretched output pulse that include the effects of laser beam angular deviation and/or divergence compared with a system that has "perfect alignment", with the graph ordinate, $\Lambda/\chi$ showing the non-dimensional laser power, according to one embodiment of the present invention.

FIG. 8 shows the one-dimensional spatial profiles of the stretched-pulse including the effects of beam deviation and/or beam divergence as calculated from equation (10). Here, $\delta$ is assumed to be 25 μrad based on the shot-to-shot beam pointing stability of a typical commercially available pulsed Nd:YAG laser, and the beam divergence, $\theta$ is assumed to be 250 grad for the same product. From FIG. 8, it can be seen that beam deviation angle resulting from pointing instability does not significantly affect to the spatial profile of the output pulse when compared with the beam diameter. However, the beam divergence causes a significant spread in the spatial profile of the output pulse; the pulse spatial profile width at FWHM is approximately 2× the size of a beam that does not go through the pulse-stretcher system. This result indicates that stretched laser pulse diameter is significantly enlarged, and in theory, can affect the spatial resolution of the system in which it is implemented. However, in actual use, it really depends on how the stretched-pulse is eventually focused in the actual probe volume.

One goal of this invention is to develop a pulse-stretcher that produces a smooth, low-power QS pulse that lasts at most, several hundred nanoseconds to permit sufficient temporal resolution for single-shot SRS measurements in subsonic flows. Another goal is to develop a pulse-stretcher that prevents laser-induced plasma generation. The laser-induced dielectric breakdown threshold for air at pressures ranging from approximately 1 to 4 atm using QS Nd:YAG laser at 532 nm is of the order $10^{12}$ to $10^{13}$ W/cm$^2$ (with a negative pressure dependence). Thus, the peak laser power needs to be kept below 0.08 GW in order to focus the laser beam down to a 0.1 mm diameter spot without generating a plasma spark. However, a more stringent requirement exists even prior to the smallest diameter beam-waist: preventing damage to optical windows/components in the focused beam path. The damage threshold of commercially available fused silica windows is ca. 1 GW/cm$^2$. Often, long focal length (>500 mm) lenses are used to focus the beam into the probe volume in order to produce a slender 1-d 'pencil-like' probe volume for the purposes of line-imaging. This produces a rather small beam diameter at the locations where the beam traverses an optical window, typically of the order 1 to 2 mm in diameter. Thus, the peak laser power must be kept below 0.02 GW if we wish to send a 1.5 mm diameter beam through fused silica. In short, the laser peak power needs to be kept well below 0.02 GW to prevent window damage and to prevent plasma spark generation.

Figure 9:
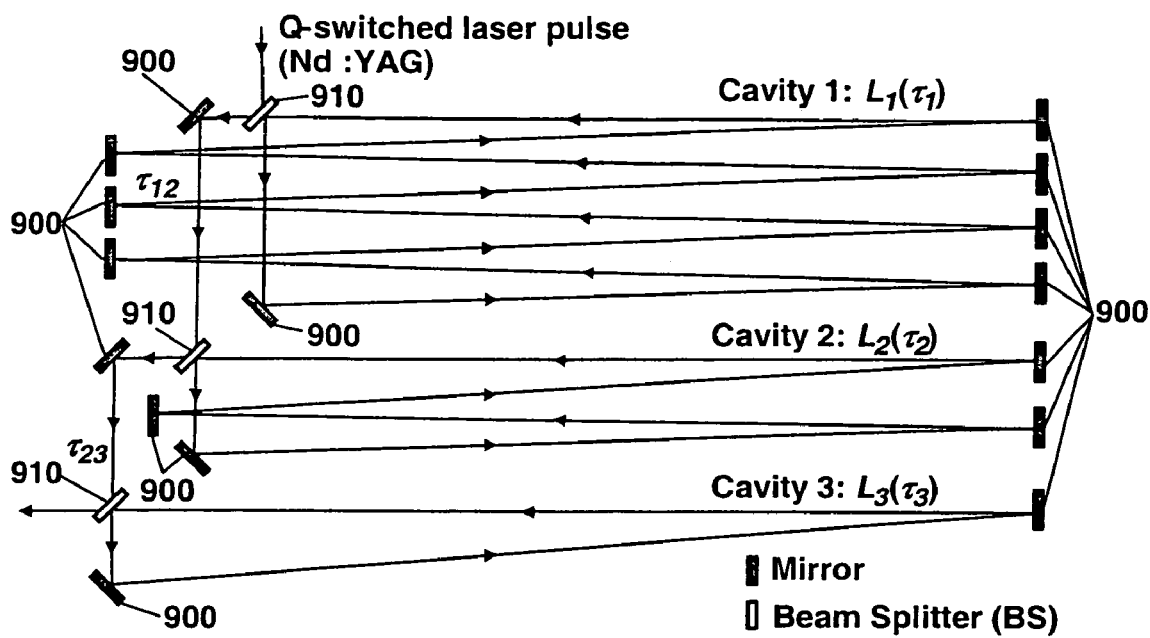
FIG. 9 illustrates a schematic of the experimental layout of the 3-cavity pulse-stretcher used (each cavity is delimited by the beam splitter), according to one embodiment of the present invention.

FIG. 9 shows the optical layout of the pulse-stretcher used in this study to experimentally verify the analytical model. This arrangement employs three optical ring-cavities (1, 2, and 3) divided by three beam splitters. Here, the longer cavities are achieved by folding the optical path with mirrors while still retaining the right-triangle arrangement. This particular design consists of eleven 0° incidence angle mirrors, five 45° (S-polarized) incidence angle mirrors, and three 45° (S-polarized) incidence beam splitters. Cavity 1, 2, and 3 perform three optical delays given by: $\tau_1$, $\tau_2$, and $\tau_3$, respectively. Each delay time is equal to the propagation time of the light across the optical propagation distance [cm], $L_1$, $L_2$, and $L_3$ in each optical cavity. Note that extra attention has to be paid to using kinematic mirror mounts that are mechanically stable and possess a high degree of adjustment resolution in order to achieve the most reliable and trouble-free pulse-stretcher.

Figure 10:
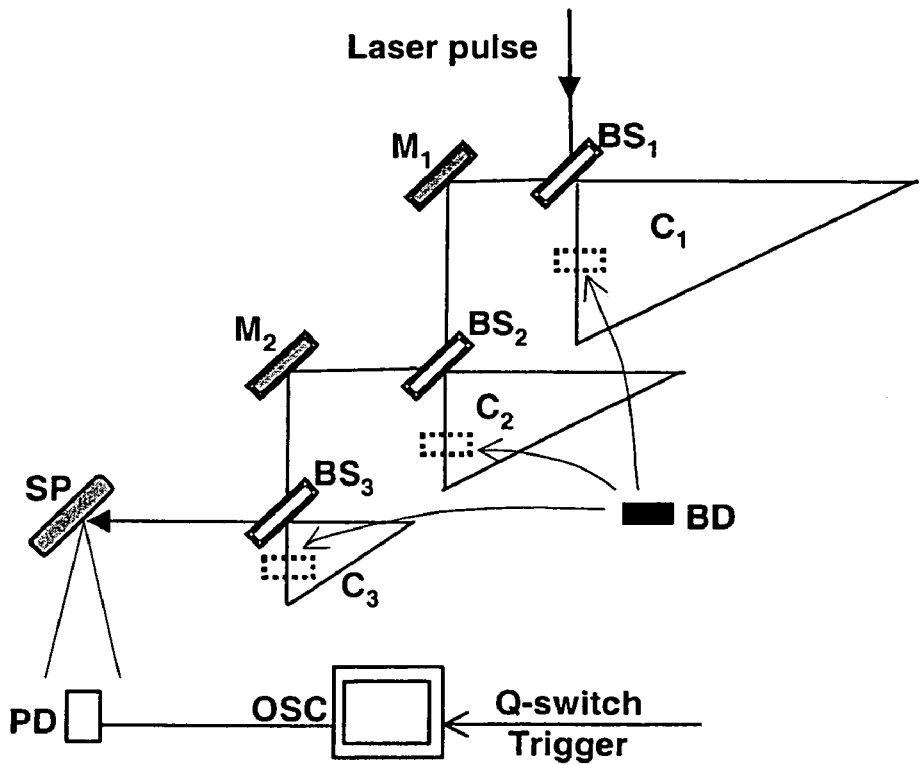
FIG. 10 illustrates a schematic of the experimental arrangement used for the pulse-stretching measurements, according to one embodiment of the present invention.

FIG. 10 shows the simplified schematic illustrating how the pulse profiles were measured after each stage of delay. By simply inserting beam dumps at the locations shown, the following 4 cases were obtained: q(t) the reflection-only output pulse representing the original pulse, $D_1(t)$ the output pulse from cavity 1 only, $D_2(t)$ the output of cavities 1 and 2, and $D_3(t)$—the final stretched-pulse with no cavities blocked. All measurements were performed with the same optical layout and components as shown in FIG. 9, with the only differences implemented by blocking different cavities as shown in FIG. 10. This permits the relative intensities between the stretched and un-stretched pulses to be compared quantitatively. An injection seeded, QS Nd:YAG laser (Spectra Physics, Quanta-Ray Pro-290) operating at 532 nm with about 1000 mJ/pulse was used as the laser source. The laser temporal pulse width was measured to be 8.4 ns (FWHM). The injection seeding feature is not required, but helps to produce a smooth pulse shape that is easier to model analytically (with a Gaussian function) and has better pulse-to-pulse energy stability with less timing-jitter.

Although the coherence length from a single longitudinal mode injection seeded laser can be quite long (many meters), any coherent spatial interference effects of the output beam profile were not observed. This is probably due to the fact that the multiple output pulses were not perfectly overlapped spatially as a result of the spatial profile instability describe above. Furthermore, the recombined multiple pulses exhibited a low level of temporal overlap with one another through the effect of the delay lines, which helps to reduce phase-sensitive optical interference effects. Finally, the stretched laser pulses are directed onto a flat-black anodized aluminum plate which served as a beam dump. The residual scattered light from the beam dump was attenuated using ND filters and detected with a fast (1 ns rise-time) Si-PIN photodiode (Thorlabs, DET-210). Output photo-currents from the photodiode, terminated into 50Ω, were recorded with 9-bit resolution at 2.5 G-samples/sec using a digital oscilloscope (Tektronix, TDS-3032B).

In order to compare experimental results with calculated results quantitatively, the stretched-pulse profile using the same optical parameters found in the experiment is calculated. For better accuracy of the resulting output pulse, the scattering losses at the anti-reflection (AR) coating surface ($L_{AR}$) of the beam splitter, the reflectivity of the 0° mirror ($R_{M0}$), and the reflectivity of the 45° mirror ($R_{M45}$), which were ignored in the previous equations, are added. Thus, the following "dimensional" equations were used to model the resulting stretched laser pulse based on Eqns. (1 & 3-6):

$$D_1(t) = (1 - L_{AR})^2 R_{BS} q(t) + \qquad (11)$$

$$(1 - L_{AR})(1 - R_{BS})^2 \sum_{n=1}^{N} [R_{M45}(R_{M0})^7]^n R_{BS}^{n-1} q(t - n\tau_1)$$

$$D_2(t) = (1 - L_{AR})^2 R_{M45} R_{BS} D_1(t - \tau_{12}) + (1 - L_{AR}) \qquad (12)$$

$$(1 - R_{BS})^2 \times \sum_{m=1}^{N} [R_{M45}(R_{M0})^3]^m R_{BS}^{m-1} D_1[t - (\tau_{1,2} + m\tau_2)]$$

$$D_3(t) \equiv (1 - L_{AR})^2 R_{M45} R_{BS} D_2(t - \tau_{23}) + \qquad (13)$$

$$(1 - L_{AR})(1 - R_{BS})^2 \times \sum_{k=1}^{N} [R_{M45}(R_{M0})]^k R_{BS}^{k-1} D_2[t - (\tau_{2,3} + k\tau_3)]$$

where t is the time [s]; $\tau_1$, $\tau_2$, $\tau_3$, $\tau_{1,2}$, and $\tau_{2,3}$ now have dimensional units of [s].

For the experimental verification of the model, measured values for the following parameters were used: E=1000 mJ, $d_t$=8.4 ns, $\tau_1$=35.2 ns, $\tau_2$=16.7 ns, $\tau_3$=9.03 ns, $\tau_{1,2}$=1.53 ns, $\tau_{2,3}$=1.10 ns, $R_{BS1}$=40%, $R_{BS2}$=41%, $R_{BS3}$=40%. Note that the delay time ratio of the actual pulse-stretcher was $\tau_1$:$\tau_2$:$\tau_3$=3.9:1.9:1 (close to the ideal 4:2:1 ratio proposed in the previous section). The manufacturer's quoted mirror performance figures were used for the remaining parameters: $L_{AR}$=0.25%, $R_{M0}$=99.5%, and $R_{M45}$=99.0% (CVI, Y2-Series high-energy mirrors).

Quantitative comparisons of the measured versus calculated pulse-stretcher profiles were realized by correcting the measured photodiode photocurrents against the optical transmittance of the series of beam splitters and mirrors. That is, the measured intensities of q(t), $D_1(t)$, and $D_2(t)$ given by equations (1), (11), and (12), respectively were attenuated due to passage through the beam splitters ($BS_1$, $BS_2$ or $BS_3$) and mirrors ($M_1$ or $M_2$). Thus, the measured intensity of q(t) should be corrected by $1/\alpha$, where $\alpha$ is the throughput efficiency of optics in FIG. 10, given by ($R_{BS1} \cdot R_{M1} \cdot R_{BS2} \cdot R_{M2} \cdot R_{BS3}$). Here $R_i$ denotes the actual reflectivity of each beam splitter or mirror directly measured by a calibrated pyroelectric laser energy meter (Molectron, J25LP-1) used with the laser operating in a long-pulse mode (ca. 2 mJ/pulse) to prevent damage to the energy meter. In the same manner, the measured time-varying power of the pulse represented by $D_1(t)$ was corrected by $1/\beta$ where $\beta$ is given by ($R_{M1} \cdot R_{BS2} \cdot R_{M2} \cdot R_{BS3}$) and the measured intensity of $D_2(t)$ was corrected by $1/\gamma$, where $\gamma$ is given by ($R_{M2} \cdot R_{BS3}$). For the throughput efficiency of $D_3(t)$, all optics used in FIG. 9 were included in equation (13).

All experimental data were calibrated using the scaling factor, $\eta$, where $\eta$ is the conversion factor from photodiode voltage (across 50Ω) [V] to laser power [J/s] for the present experimental condition, to fit the peak power point of the measured original pulse, q(t) to the calculated laser pulse. The measured q(t) signal was calibrated by delaying the signal during processing by ($\tau_{1,2} + \tau_{2,3}$) to compensate for the fact that q(t) was measured just after $BS_3$ while the calculated q(t) means the one just before $BS_1$. Thus, a quantitative representation of laser power versus time for the experimentally measured stretched-pulse was achieved.

Figure 11:
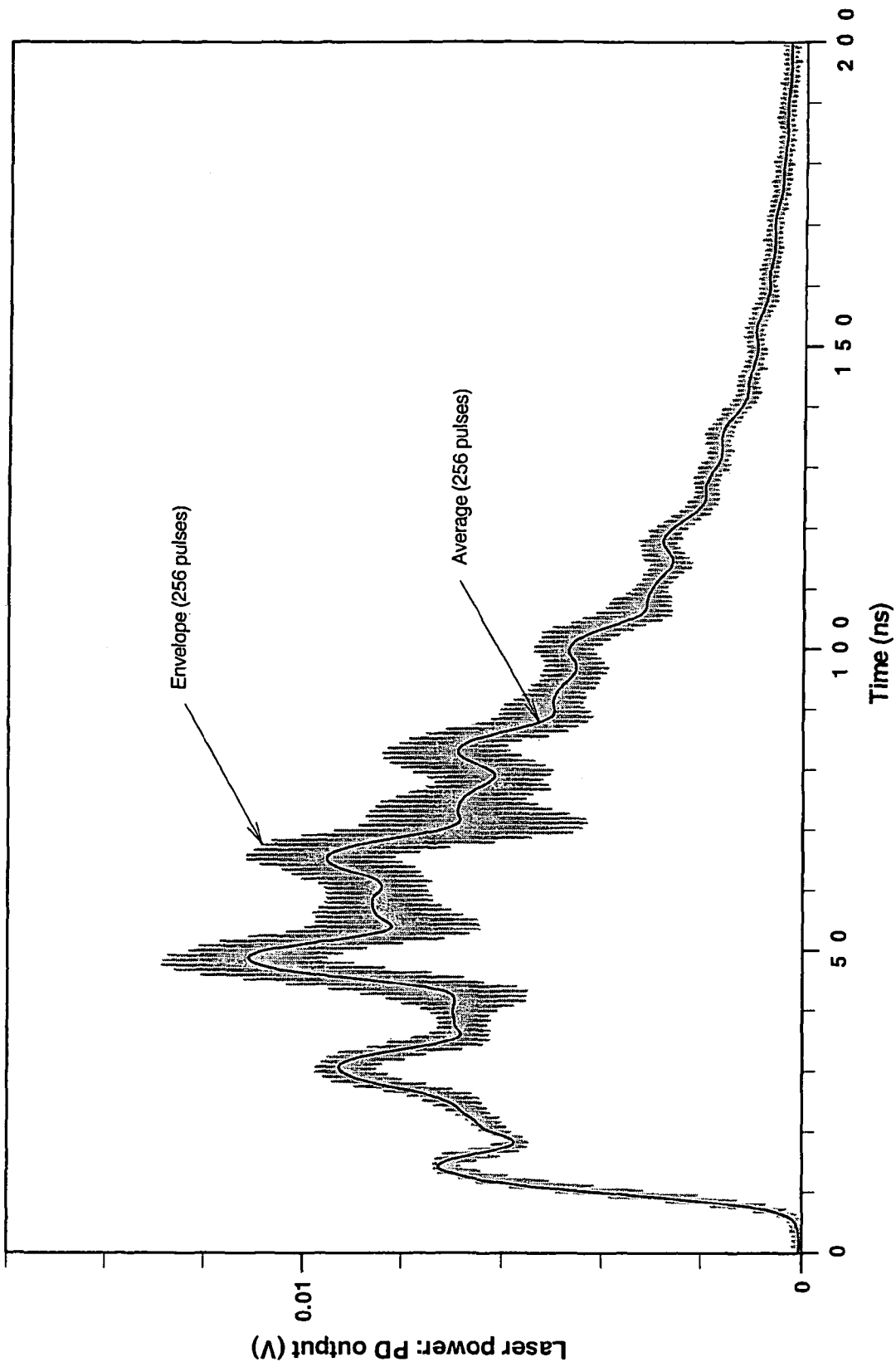
FIG. 11 illustrates the measured temporal profile of the stretched-pulse output using the 3-cavity pulse-stretcher shown in FIG. 9, according to one embodiment of the present invention.

FIG. 11 shows the measured average and envelope temporal profile of the stretched-pulse for 256 shots. A relatively high variation in laser intensity of ±21% against the mean value was observed for the period from 40 to 85 ns and variation of ±15% was observed at the maximum point of intensity profile at 49 ns. These variations indicate that a factor of safety at least 15% should be provided when selecting optical components such as mirrors or windows in the beam path following the pulse-stretcher, that may be damaged by higher peak pulse intensities. This factor of safety should also be included in the design of the minimum diameter of the beam waist to prevent optical breakdown of the gases at the focal point. This variation results partly from laser energy stability of ±3%, and mainly from effects of minor optical cavity misalignment, shot-to-shot beam-pointing stability, and beam-divergence as shown in FIG. 8 which cause laser beam clipping at the edge of optics.

Figure 12:
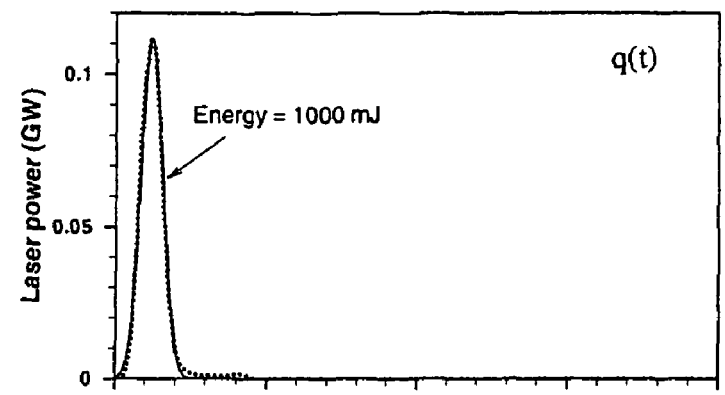
FIG. 12 illustrates temporal profiles of measured and calculated laser pulses, with FIG. 12(*a*) showing q(t), the original pulse, FIG. 12(*b*) showing $D_1(t)$, the output pulse from cavity 1 only, with FIG. 12(*c*) showing $D_2(t)$, the output pulse from cavity 2 (after passing through cavity 1 and 2), and with FIG. 12(*d*) showing $D_3(t)$, the final output or 'stretched-pulse', according to one embodiment of the present invention.
Figure 12:
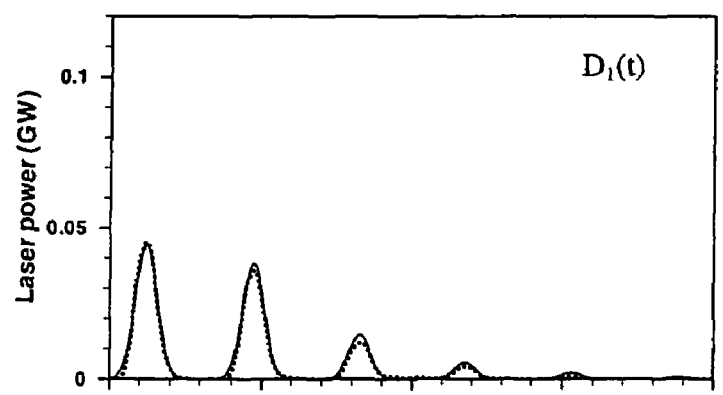
Figure 12:
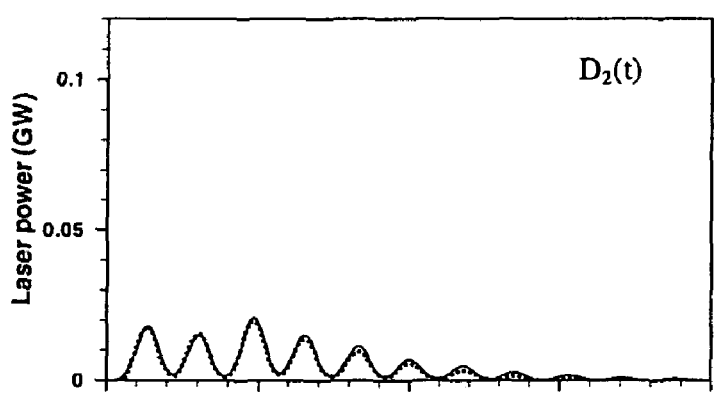
Figure 12:
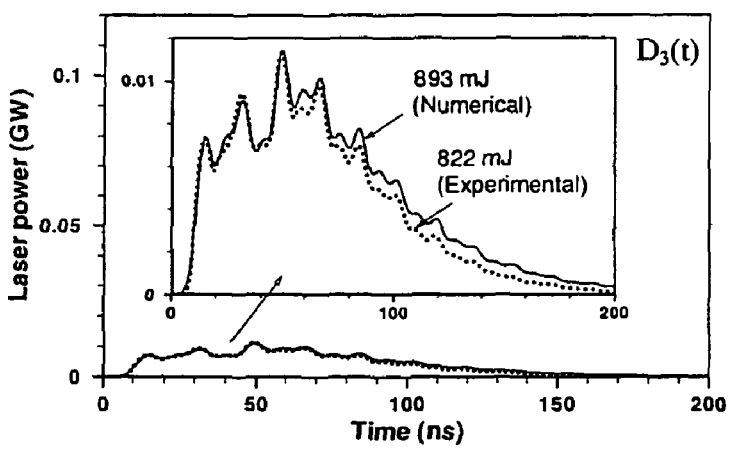

FIG. 12 shows the calculated temporal profiles of the original laser pulse and output pulses from the pulse-stretcher. The measured pulses for q(t), $D_1(t)$, $D_2(t)$, and the stretched-pulse, $D_3(t)$ show excellent agreement with the calculated pulses on overall shape. FIG. 12 shows the evolution from a original short pulse to a stretched-pulse. First, a single 8.4 ns-long FWHM pulse, q(t), is divided into approximately six smaller pulses by cavity 1, shown by $D_1(t)$. Then, the output of $D_1(t)$ is divided to about eleven smaller pulses by cavity 2, shown by $D_2(t)$. Finally, the final pulse-stretcher output produces a much longer continuous pulse that is over 150 ns wide (approximately 75 ns half width) and reduces the peak laser power down to 0.011 GW from 0.11 GW, or 10% of the initial peak power. From FIG. 12(d) the stretched-pulse was found to maintain 82% of its initial laser energy by direct numerical integration of the experimentally measured stretched-pulse laser signal. This throughput efficiency value agrees extremely well with the result of 83±5% as directly measured by the pyroelectric energy meter (which does not account for the temporal shape of the pulse). This remarkable agreement shows that the calibration procedure outlined above indeed permits an accurate and quantitative comparison of the measured to the calculated instantaneous laser power.

The inset curve in FIG. 12(d) shows that the detailed profile of the calculated stretched-pulse for the period from 0 to 50 ns. However, the experimental data is about 25% lower than the calculation in the decay curve portion of the pulse (after 80 ns) because of the combined effects of beam divergence and beam pointing instability as discussed previously. This effect becomes more prominent for the pulses that travel longer distances as the third and later peaks in the measured $D_1(t)$ and $D_2(t)$ profiles show slightly lower power than calculated profiles—the energy is simply lost due to beam clipping resulting from misalignment and divergence. Consequently, the experimentally measured stretched-pulse energy of 822 mJ is approximately 8% lower than predicted best total pulse energy of 933 mJ (limited only by mirror and beam splitter losses). This level of discrepancy is relatively minor and the accuracy of the model is sufficient for the purposes of designing and predicting pulse-stretcher performance. The majority of the energy losses result primarily from the limitations in the manual-alignment of the pulse stretcher system, and from the beam divergence which causes beam clipping losses when the spatial profile of the beam exceeds the diameter of the optic component. In most embodiments, 50 mm diameter optics were used for all mirrors and beam splitters in this study; with the 45° beam splitter, the clear aperture is reduced by $1/\sqrt{2}$. However, another option is to use larger diameter optics (say 75 mm) that reduces the effects of beam-clipping resulting from beam divergences. However, the cost of the optics becomes increasingly prohibitive with such large diameters.

Figure 13:
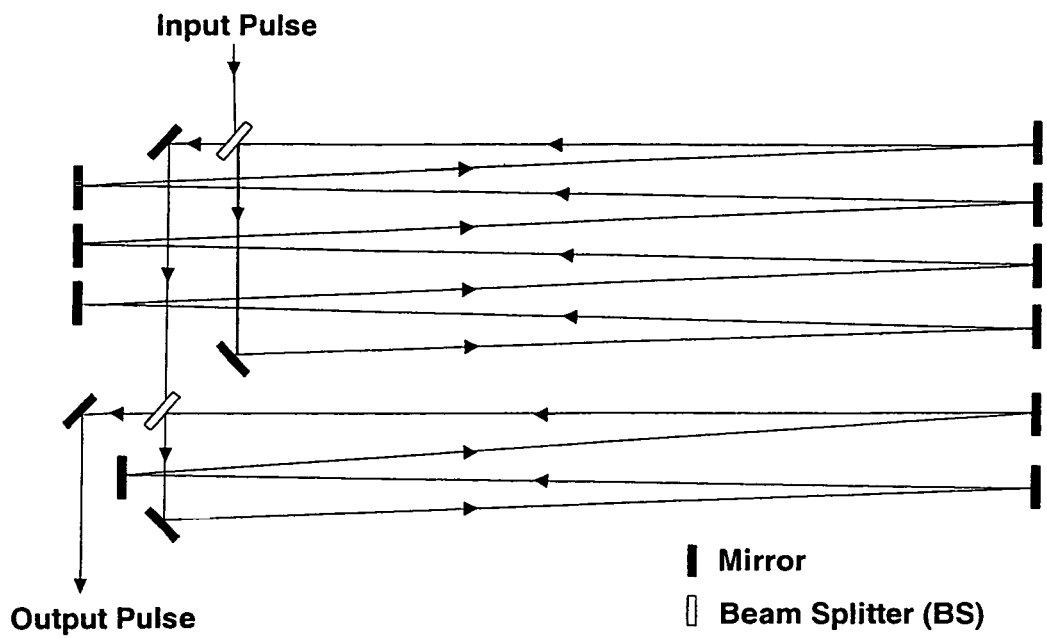
FIG. 13 illustrates a schematic of a 2-cavity multi-pulse generator, according to one embodiment of the present invention.

FIG. 13 illustrates a schematic of a 2-cavity multi-pulse generator, according to another embodiment of the present invention. The optics utilize high-reflectivity dielectric coated optics for maximum energy efficiency and durability. The system is passive and requires no electronics or complicated modulation schemes. According to this embodiment, the system may be used as a passive multi-pulse generator for use as a stroboscopic light source for high speed ballistic projectile imaging studies or can be used for high speed flow diagnostics using a laser light sheet with digital particle imaging velocimetry.

Figure 14:
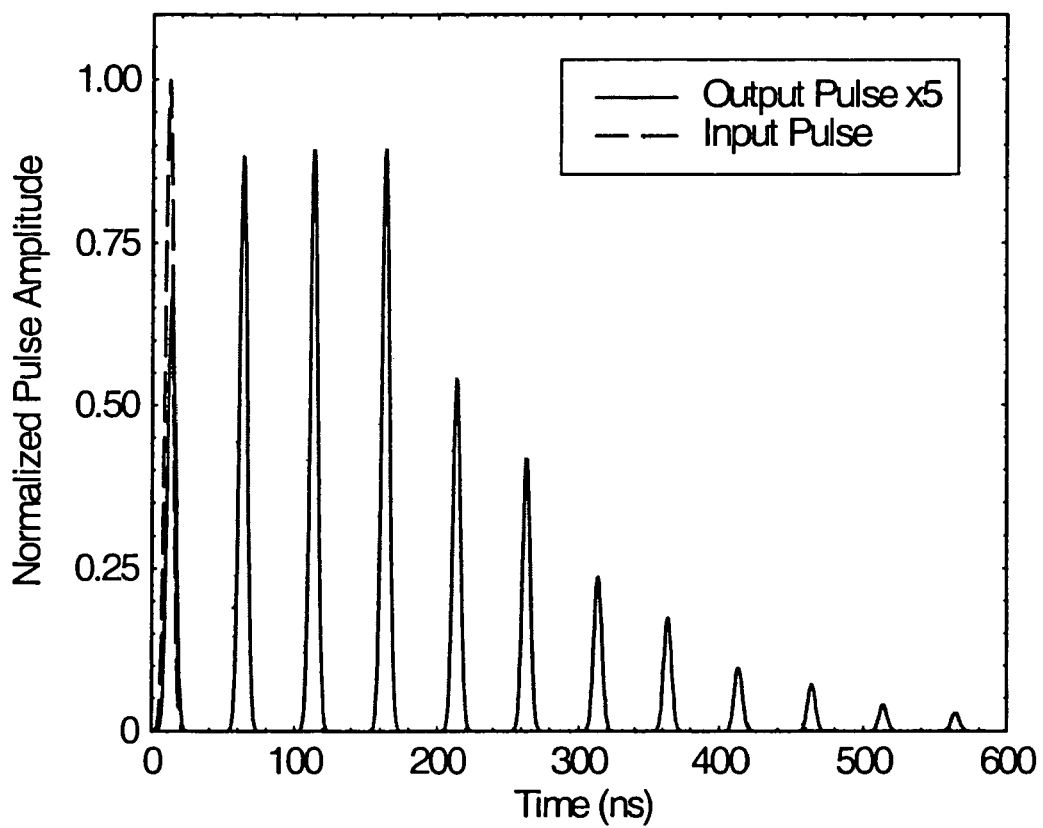
FIG. 14 illustrates typical performance of a 20 MHz multi-pulse generator system calculated using a 2-cavity setup with a 6.4 ns (FWHM) input pulse, according to one embodiment of the present invention.

FIG. 14 illustrates typical performance of a 20 MHz multi-pulse generator system calculated using a 2-cavity setup with a 6.4 ns (FWHM) input pulse, according to one embodiment of the present invention. It is noted that output pulse curve has been scaled by 5×. Approximately 6 pulses with pulse amplitudes ranging from 10% to about 20% of the input pulse amplitude can be generated using this system. The model used for this calculation has been extensively verified by experiment. Other repetition rates and pulse envelope shapes can be obtained by changing and tuning various parameters of the pulse-generator system. Specifically, the parameters for this calculation were: Gaussian profile input pulse with a 6.4 ns (FWHM); Cavity-1: $\tau_1$=100 ns, $R_{Bs1}$=0.40; Cavity-2: $\tau_2$=50 ns, RBS2=0.34; Cavity-cavity delay $\tau_{12}$=1.7 ns.

In the present invention, a simple and passive ns-long laser pulse-stretching system is described using multiple low-finesse optical ring-cavities utilizing a partially transmitting beam splitter. The pulse-stretching process is modeled with an expression that can be used to describe a pulse-stretcher containing an arbitrary number of optical cavities. It is believed that this is the first time that a model of the multiple ring-cavity pulse-stretcher has been developed that explicitly includes the effects of cavity delay time, beam splitter reflectivity, and total number of optical cavities.

Furthermore, the present invention also addresses the effects of the spatial profile sensitivity. Using the model, the design of a pulse-stretcher system suitable is optimized for use in a spontaneous Raman scattering excitation system that avoids the problematic laser-induced plasma spark problems that often accompany QS Nd:YAG excitation sources. From the optimized design, the model was experimentally demonstrated and verified with a 3-cavity pulse-stretcher system that converts a 1000 mJ, 8.4 ns-long laser pulse into an approximately 150 ns-long (75 ns FWHM) output pulse with a peak power reduction of 0.10×, and an 83% efficiency.

The processes of the present invention provide excellent agreement between model and experiment for the overall pulse profiles which indicates that the model can be used to accurately predict the performance for other general multi-cavity pulse-stretcher designs for the ns-long pulse regime. The present invention also found that laser beam-pointing instability was a minor factor on the quality of the spatial profile of the output pulse, rather, the laser beam divergence and cavity alignment were found to be much more critical.

The following observations can be used as guidelines in the design of an optimized pulse-stretching system. The cavity length (and delay time) for the optical cavities is dictated by input laser pulse width $D_t$ (FWHM) [ns], and the shortest cavity delay time should equal the laser pulse width. Longer delay time cavities preceding the shortest cavity should double in geometric progression, thus, for a 3-cavity system a 4:2:1 ratio should be used. The optimum beam splitter reflectivity for the lowest peak-power, yet physically shortest cavity length is approximately 40%. A 3-cavity system provides an approximate 0.10× reduction in peak power, with each additional cavity reducing the peak power by approximately an additional 0.5×.

It may also be mentioned that the pulse stretcher should be aligned, one cavity at a time, with the output of stage one, directed into the subsequent stage. For the alignment process, a Q-switched Nd:YAG laser with a so-called 'long pulse' mode may be used in which the Q-switch is held open to allow the laser to produce a train of several hundred low energy (micro Joule) pulses with a total energy of about 2 mJ. This is a commercially available option on a certain brand (Spectra Physics—Quanta Ray) of laser (but not available on all brands of lasers). This long pulse mode is useful because it permits alignment with a relatively safe level of pulse energy that will not damage mirrors and optics should the alignment be incorrect. Other useful things that permit easier alignment is the use of variable apertures (irises) mounted on fixed height optical posts which can be moved around on the optical table to check and ensure that the laser beam is planar (not going up and down). This is important to keep the polarization state from rotating with out-of-plane reflections.

Figure 15:
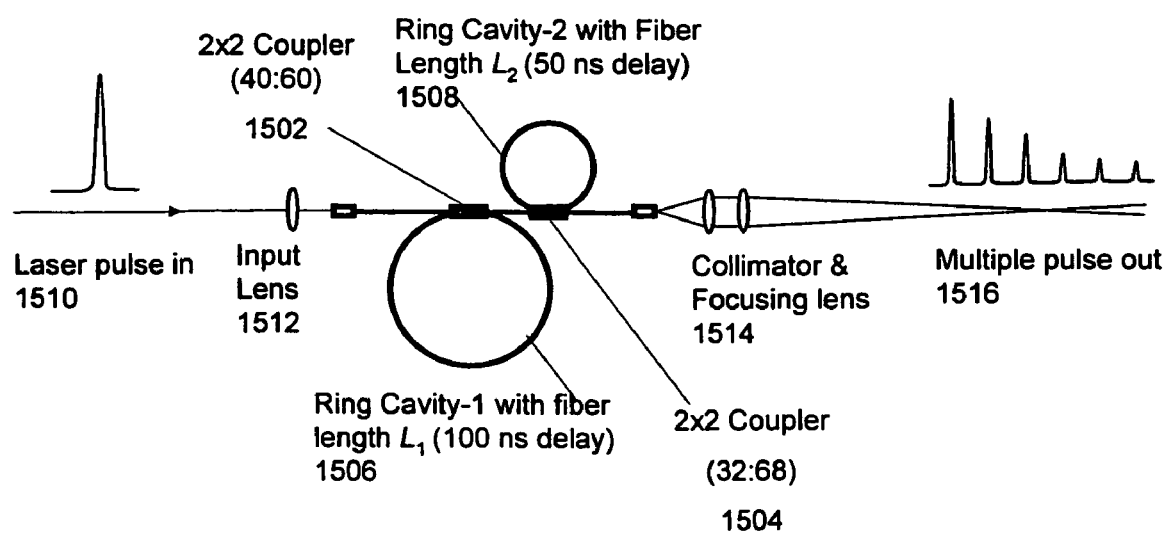
FIG. 15 illustrates a schematic of an all fiber optic embodiment of the multi-pulse generator depicted in FIG. 13.

Yet another embodiment of the present invention utilizes fiber optic components to realize a robust, compact, and alignment-free means of optical pulse manipulation as described above. By utilizing single-mode optical fibers of the appropriate wavelength range, the functions of the optical ring cavity and beam splitter, can be implemented using a fiber optic loop 1506/1508, and a fiber optic 2×2 coupler 1502/1504, respectively, as shown in FIG. 15. In an embodiment of the invention, the single-mode optical fibers of the appropriate wavelength range is preferably polarization-maintaining and the fiber optic 2×2 coupler is preferably polarization-maintaining. Note that the calculation of the fiber optic propagation delay time (fiber length) will have to include the index of refraction within the fiber, and custom fiber optic couplers will be used to achieve the reflectivities similar to those described for the multi-pulse generator used in FIG. 14. As an example, in order for the fiber optic embodiment to produce exactly the same output as depicted by the free-space system shown in FIG. 14, the following specifications may be used for a optical fiber based system with an index of refraction n=1.447 (silica fiber): $L_1$=20.73 m, $L_2$=10.37 m, and $L_{12}$=0.35 m, where $L_N$ refers to the fiber length of cavity N, and $L_{NM}$ refers to the fiber length connecting cavity N and M, respectively. Here, a 40:60 2×2 coupler refers to a 40% reflection: 60% transmission 2×2-port fiber optic coupler.

In the embodiment illustrated in FIG. 15, a laser pulse 1510 is inputted to input lens 1512. Laser pulse 1510 is then provided with the functions of the optical ring cavity and beam splitter, using a fiber optic loops 1506/1508, and a fiber optic 2×2 couplers 1502/1504, respectively. The output is passed through a collimator and focusing lens 1514, thereby providing multiple output pulses 1516.

While the physical space required by the free-space multiple optical ring-cavities depicted in FIG. 13 occupies approximately 5 $m^2$ of optical table space and occupying 1 $m^3$ of volume, an equivalent system implemented using fiber optic components would occupy less than 0.01 $m^2$ of area and have a total volume of 0.00025 $m^3$. This embodiment can be used for both a pulse stretcher or a multi-pulse generator. Due to the reduced peak optical power that fiber optic systems can transmit (limited by the damage threshold of the glass fiber), this embodiment would have applications as a seed source for laser oscillators or amplifiers, or as a pulse multiplier for high-bandwidth fiber optic telecommunications systems. For example, a 10 GHz repetition rate pulsed telecommunications diode laser source could easily be made to passively produce a 60 GHz pulse train with the use of the fiber optic pulse multiplier as described above.

Although the invention has been described based upon these preferred embodiments, it would be apparent to those skilled in the art that certain modifications, variations, and alternative constructions would be apparent, while remaining within the spirit and scope of the invention. In order to determine the metes and bounds of the invention, therefore, reference should be made to the appended claims.

The invention claimed is:

1. An optical pulse stretcher comprising: A plurality of optical cavities arranged in series where the first optical cavity in series receives an input optical laser beam and the last optical cavity in series emits an output optical laser beam, where each optical cavity comprises: a plurality of optical reflectors; and an optical path length; wherein the optical path length of each optical cavity is ½ the optical path length of the preceding optical cavity in series so as to reduce peak laser power while maintaining total pulse energy, wherein the last optical cavity in series has an optical path length approximately equal to the temporal pulse duration of the input optical laser beam multiplied by the speed of light.

2. The optical pulse stretcher as recited in claim 1, wherein the temporal pulse width of the input optical laser beam is approximately given by the temporal full width at half-maximum (FWHM) of the input optical laser beam.

3. The optical pulse stretcher as recited in claim 2, wherein the output optical laser beam is suitable for use in a spontaneous Raman-scattering spectroscopy system.

4. The optical pulse stretcher as recited in claim 2, wherein the output optical laser beam comprises a series of pulses that are applicable as a stroboscopic light source.

5. The optical pulse stretcher as recited in claim 4, wherein the series of pulses that are applicable as a stroboscopic light source is suitable for high-speed ballistic projectile imaging.

6. An optical pulse stretcher comprising:
A plurality of optical cavities arranged in series where the first optical cavity in series receives an input optical laser beam and the last optical cavity in series emits an output optical laser beam, where each optical cavity comprises:
a plurality of optical reflectors; and
an optical path length;
wherein the last optical cavity in series has a round-trip propagation time approximately equal to the laser pulse temporal width so as to reduce peak laser power while maintaining total pulse energy.

7. The optical pulse stretcher as recited in claim 6, wherein the temporal pulse width of the input optical laser beam is approximately equal to the temporal full width at half-maximum (FWHM) of the input optical laser beam.

8. The optical pulse stretcher as recited in claim 7, further comprising at least one beam splitter having a defined reflectivity wherein the at least one beam splitter is configured to intercept a portion of the input optical laser beam and to divert the portion of the input optical laser beam into at least one of the series of optical cavities.

9. The optical pulse stretcher as recited in claim 8, wherein each optical cavity comprises at least one beam splitter configured to receive a portion of the input optical laser beam and emit an output optical laser beam therefrom.

10. The optical pulse stretcher as recited in claim 9, wherein the at least one beam splitter has a reflectivity of between 30% and 50%.

11. The optical pulse stretcher as recited in claim 10, wherein the at least one beam splitter has a reflectivity of approximately 40%.

12. The optical pulse stretcher as recited in claim 11, wherein the plurality of optical cavities comprises three optical cavities.

13. A method of stretching an optical pulse comprising: providing a plurality of optical cavities arranged in series and having different optical path lengths; providing that the different optical path length of each cavity is ½ the optical path length of the preceding optical cavity in series; introducing an input optical laser beam into the first optical cavity which results in an output optical laser beam emitting from each optical cavity; producing, with the input beam and output beam portions, an output optical beam that is stretched and has a power that is reduced when compared to the input optical beam, and providing that the last optical cavity in series has an optical path length approximately equal to the temporal pulse duration of the input optical laser beam multiplied by the speed of light.

14. The method of stretching an optical pulse as recited in claim 13, further comprising:
providing at least one beam splitter so as to divert a portion of the input optical beam into at least one of the optical cavities.

15. The method of stretching an optical pulse as recited in claim 14, further comprising:
   providing at least one beam splitter associated with each optical cavity such that the associated optical cavity receives an input optical laser beam and emits an output optical laser beam therethrough.

16. The method of stretching an optical pulse as recited in claim 15, further comprising:
   providing the at least one beam splitter has a reflectivity of approximately 40%.

17. The method of stretching an optical pulse as recited in claim 16 wherein the temporal pulse width of the input optical laser beam is approximately the temporal full width at half-maximum (FWHM) of the input optical laser beam.

* * * * *